(12) United States Patent
Clark et al.

(10) Patent No.: US 9,020,535 B2
(45) Date of Patent: Apr. 28, 2015

(54) METHOD AND SYSTEM FOR PROVIDING A RADIO STATION LOCATOR SERVICE

(75) Inventors: Stephen J. Clark, Allen, TX (US); Donald S. Bodge, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 349 days.

(21) Appl. No.: 12/916,783

(22) Filed: Nov. 1, 2010

(65) Prior Publication Data
US 2012/0108266 A1     May 3, 2012

(51) Int. Cl.
*H04W 4/02*     (2009.01)
*H04H 60/50*    (2008.01)

(52) U.S. Cl.
CPC  *H04W 4/02* (2013.01); *H04H 60/50* (2013.01)

(58) Field of Classification Search
CPC .............................. H04H 60/50; H04W 4/02
USPC .......... 455/456.3, 456.1, 154.1, 179.1, 186.1, 455/404.2
See application file for complete search history.

(56) References Cited

U.S. PATENT DOCUMENTS

| | | | |
|---|---|---|---|
| 7,725,256 B2 * | 5/2010 | Marsh | 701/515 |
| 2003/0013425 A1 * | 1/2003 | Nee | 455/186.1 |
| 2008/0187188 A1 * | 8/2008 | Beletski et al. | 382/124 |
| 2008/0242358 A1 * | 10/2008 | Woo | 455/566 |
| 2011/0035218 A1 * | 2/2011 | Pettinato | 704/235 |
| 2011/0196914 A1 * | 8/2011 | Tribbett | 709/203 |
| 2012/0021772 A1 * | 1/2012 | Drennan | 455/456.3 |

* cited by examiner

Primary Examiner — Qun Shen

(57) ABSTRACT

An approach is provided to present station location information to one or more mobile devices. A request is received to provide station location information to a mobile device. Station location information is generated, in response to the request, the station location information including station location information of one or more radio stations that correspond to the location of the mobile device. The station location information is transmitted to the mobile device.

22 Claims, 10 Drawing Sheets

METHOD AND SYSTEM FOR PROVIDING A RADIO STATION LOCATOR SERVICE

BACKGROUND INFORMATION

Service providers are continually challenged to develop new and innovative services to remain competitive. Consumer adoption of mobile devices, such as cellular telephones, laptop computers, pagers, personal digital assistants, and the like, is increasing. These devices can be used for a diversity of purposes ranging from basic communications, to conducting business transactions, to managing entertainment media, as well as a host of other tasks. Additional enhancements, such as location-awareness features, e.g., global positioning system (GPS) tracking, also enable mobile device users to monitor their position and present their location via a local display. Such mobile technology have enabled users to access rich media services over a data communications infrastructure, such as the Internet. However, little effort has been expended to integrate mobile technology with mature services such as broadcast radio. There are numerous broadcast radio stations available to users—e.g., news, weather, talk radio, sports, music, other forms of entertainment, etc.; all of which have limited geographical constraints for their radio broadcasts. Furthermore, users often may not know what broadcast stations are available, especially while traveling to unfamiliar areas. This is particularly challenging with the variety and routing changes in broadcast radio programming. Unfortunately, users in such a situation must resort to utilizing the radio tuner to scan for local radio stations that suits their listening preferences. This random tuning for radio stations can be time consuming, and serve as a deterrent to listening to the radio all together.

Therefore, there is a need for an approach that can efficiently and effectively locate broadcast stations.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing station location information services for mobile devices are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to tracking mobile devices and providing mobile devices with station location information, it is contemplated that various exemplary embodiments are also applicable to stationary devices as well as other applications.

Figure 1A:
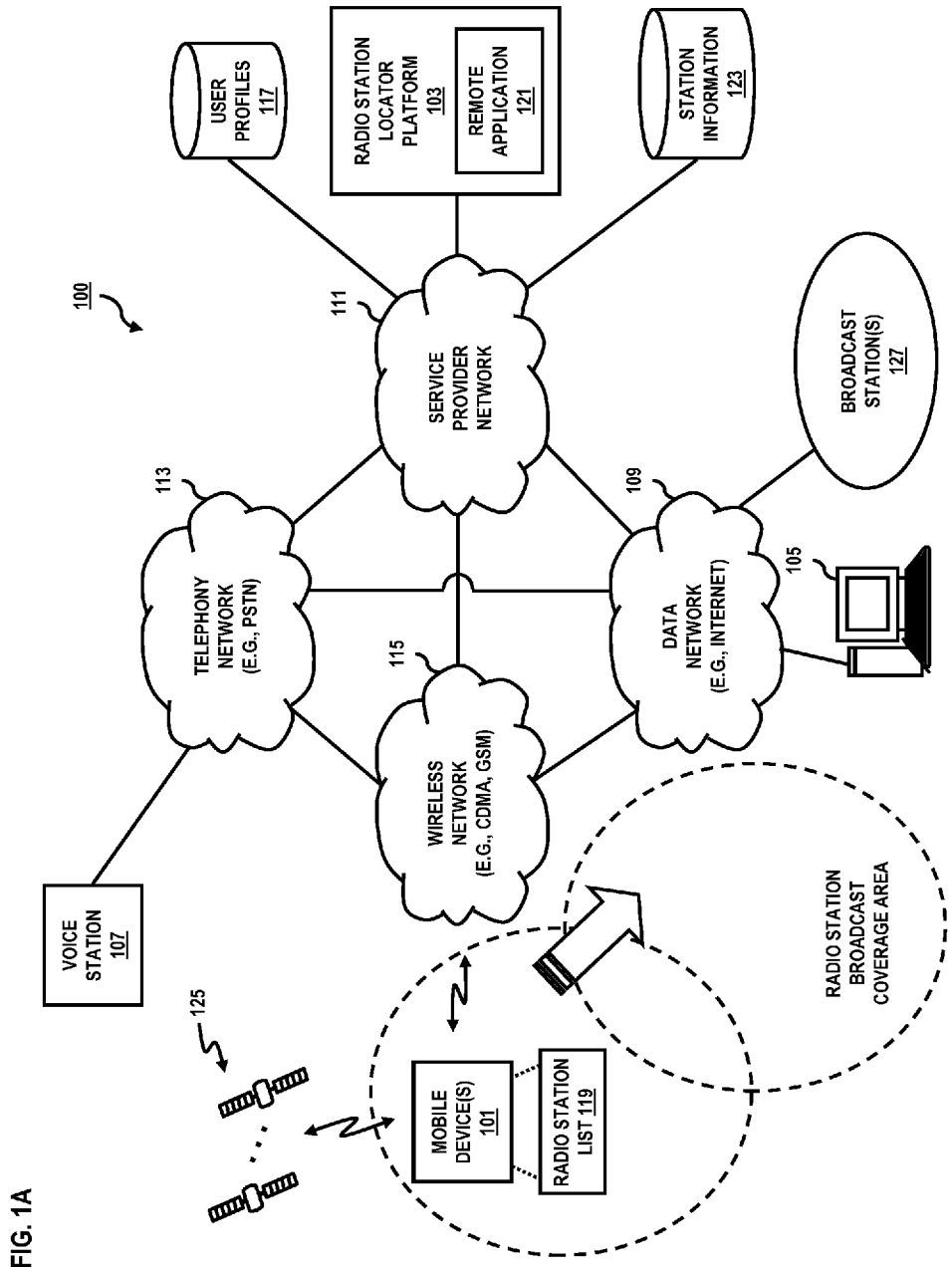
FIGS. 1A and 1B are, respectively, a diagram of a system configured to provide radio station locator services for mobile devices, and a flowchart of process for providing radio station locator service, according to various embodiments.
Figure 1B:
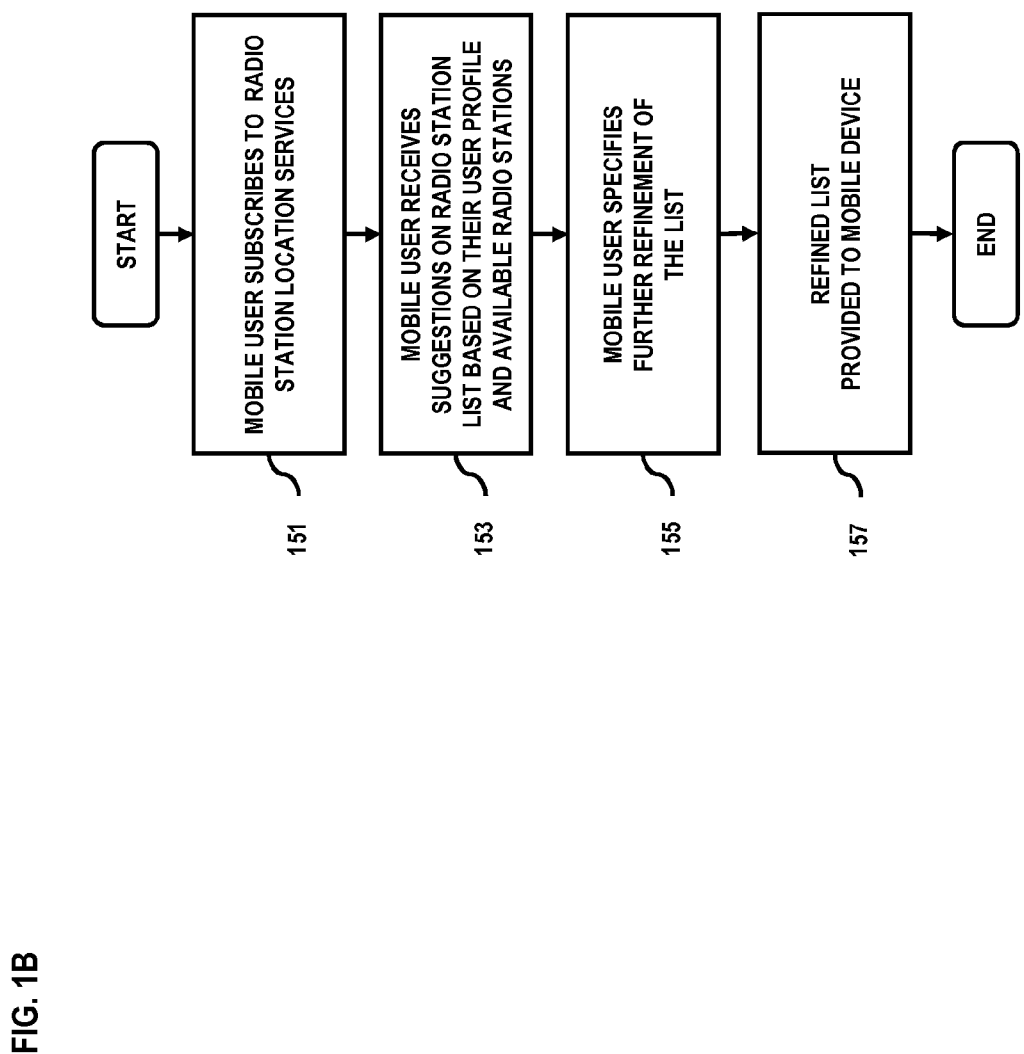

FIGS. 1A and 1B are, respectively, a diagram of a system configured to provide station locator services for mobile devices, and a flowchart of process for providing radio station location information, according to an exemplary embodiment. For the purpose of illustration, system 100 for providing station location information to one or more mobile devices 101, such as one or more cellular phones, is described with respect to radio station locator platform 103. According to certain embodiments, users at user or client devices (e.g., computing device 105, voice station 107, etc.) may access the features and functionalities of platform 103 over one or more networks, such as data network 109, service provider network 111, telephony network 113, and/or wireless network 115, in order to receive station location information for available radio stations that correspond to the location and/or surrounding environment of their mobile devices 101. It is noted that voice station 107 may possess computing functionality as to support messaging services (e.g., short message service (SMS)), and thus, can partake in the services of platform 103. Station location information may be in the form of a list of one or more radio stations; the information can be presented via a visual display and/or audio presentation, and include, in certain embodiments, radio station frequency and call letters, station location, coverage radius, program content metadata, and advertisement frequency. While specific reference will be made hereto, it is contemplated that system 100 may embody many forms and include multiple and/or alternative components and facilities.

It is observed that portable device users who enjoy an increased level of mobility often travel to new locations and may desire to tune into available radio broadcasts. Traditionally, when a user of a portable device and/or a radio tuner, desired to tune into a radio broadcast, for whatever the reason, the use of conventional approaches to obtain station location information or, at least, identify a radio station, has yielded distractions and time consuming efforts, if successful. Moreover, a search for a radio station may result in a dangerous distraction, if the user is operating a vehicle for transportation, as the user would have to divert his or her attention away from operating the vehicle for a prolonged period of time.

Therefore, the approach of system 100, according to certain exemplary embodiments, stems from the recognition that consumers can benefit from remote tracking services, whereby subscribers (or users) are given access to platform 103 for obtaining station location information, pertaining to one or more radio stations, to be presented on their devices, such as one or more mobile devices. The station location information may be in the form of a list of one or more radio stations, which is presentable to the subscribers via a visual display and/or audio presentation. For instance, subscribers may access the platform 103 for submitting spatial positioning information (e.g., an address, latitude, longitude, elevation, etc.) corresponding to the location of a device in order to receive station location information of available radio stations and/or tune a radio interface (e.g., a radio tuner) of the device to tune into one or more available radio stations. This spatial positioning information may be overlaid on, for instance, a topological depiction of a geographic area surrounding the location of the device, which may also be appended with various cartographic features, such as buildings, landmarks, roadways, signs, and the like, or provided with directions to the location of the device. Available radio stations may include any broadcast radio stations that broadcast radio signals that capable of reception in an environment of the mobile device. Subscribers may also be given access to the platform 103 to access and/or update subscription information and/or a user profile. The user profile could provide various information corresponding to the subscriber, such as, but not limited to, user preferences, access codes, subscriber history, and subscription information. For example, a user profile may store in a user profile, preferences for favorite radio stations, radio station format (e.g., news, traffic, music, sports), music genre (e.g., classical, rock, hip hop, country), radio personalities (e.g., local radio hosts, nationally syndicated hosts), etc. Still further, the platform 103 may utilize an application to automatically generate these user preferences, such as, by communicating with other on-line services of the user (e.g., an on-line music store that maintains musical preferences and purchase history).

FIG. 1B is a flowchart of a process for subscribing a user to the radio station locator service, according to an exemplary embodiment. In step 151, a mobile device user subscribes to the radio station locator services. According to an exemplary embodiment, when registering, the user of mobile device 101 may register the mobile device 101, and any additional user devices 105 and 107. In step, the mobile device user may create a customizable and manageable user profile. The user profile can include user preferences relating to the radio station locator service (e.g., musical preference, etc.), account services information, personal information, etc. In particular, the user profile may be customized by the user to store user preferences such as, favorite radio stations, radio station formats, music genres, radio personalities, etc. For example, the user may customize a user profile to include news and music as preferred radio station formats, and classical music as a preferred music genre.

In step 153, the mobile device 103 receives a suggested list of radio stations; such list can be generated based on the location of the mobile device 101 and, optionally, the information stored in a user profile. The generation of the list of radio station may originate with a request from the subscriber, or may be an automated response from another network entity, e.g., platform 103 or computing device 105. The list of radio stations may categorize the radio stations by station frequency, station call letters, station address, station contact information, station coverage, program content metadata, and advertisement frequency, and any combination thereof. For example, a list of radio stations generated for a user having preferences for news and classical music that are stored in a user profile, may receive a list of various news stations and music stations that play classical musical.

In step 155, the user can specify further refinements of the radio stations through a menu driven series of prompts for user input. For example, the radio station list may include several options for narrowing the generated radio station list. This capability is further detailed with respect to FIG. 1C. Upon specifying the particular refinement options, the platform 103 provides a more refined list, per step 157. As a result, the user may then tune the nearby radio equipment using this refined list. Alternatively, if the mobile device 103 includes a radio tuner, the user may select the radio station and tune the mobile device via an application protocol interface (API). Such radio station information is updated continually based on the location of the device 103, thereby permitting the subscriber to efficiently find a radio station that suits the user's preference.

Figure 1C:
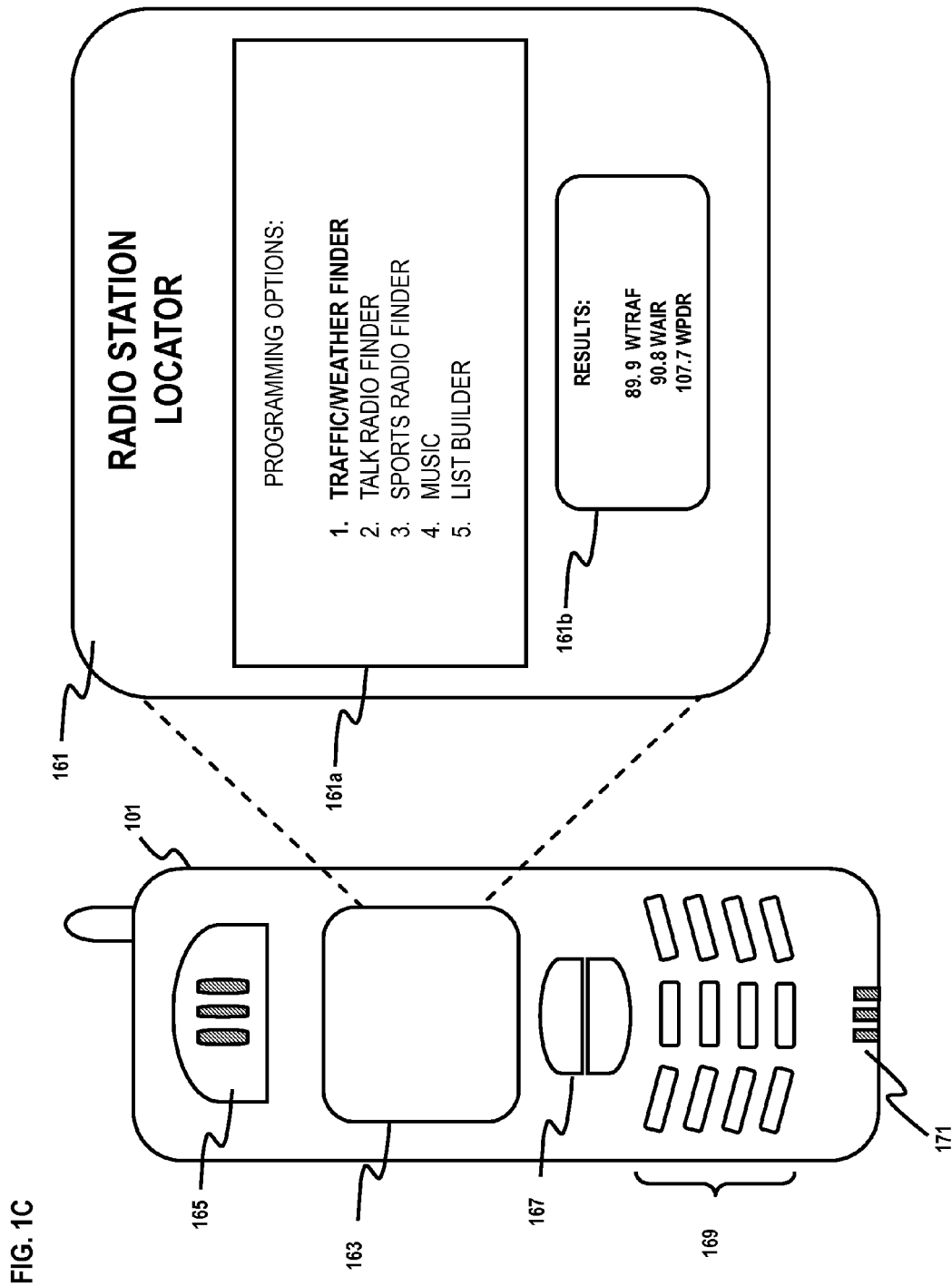
FIG. 1C is a diagram of a mobile device capable of providing a graphical user interface (GUI) configured to present a radio station locator menu, according to an exemplary embodiment.

FIG. 1C is a diagram of a mobile device capable of providing a graphical user interface (GUI) configured to present a radio station locator menu, according to an exemplary embodiment. In this example, a user may employ mobile device 101 to receive radio station information as described in the process of FIG. 1B. For illustrative purposes, mobile device 101 is described with respect to a cellular phone configured to provide a GUI 161 to users via display 163.

GUI 161 includes a text box 161a that illustrates a menu of optional programming associated with available radio stations within the vicinity of the mobile device 101. In this example, the following options are provided to the user: (1) traffic/weather finder, (2) talk radio finder, (3) sports radio finder, (4) music, and (5) list builder. In one embodiment, these options are defined according to the user profile. Under option (1), selection of this traffic/traffic finder feature specifies the particular radio stations that are classified as traffic and weather stations; such programming may be supplemented with information, such as a phone number or SMS contact, specifying who or what entity to contact to obtain information or news relating to traffic accidents or road conditions.

Upon selection of option (2), an expanded list of sub-categories can be displayed to fine tune the user's search for the desired radio stations. For example, under talk radio, these sub-categories may include the following: political, spiritual, and financial. Likewise, option (3) associated with sports radio finder, the sub-categories of "sports talk" and "game broadcast/schedule" may be presented.

In addition to providing radio station information, various sophisticated features may be layered with the radio station locator services. For instance, under option (4) music, a host of features can be offered: playlist information relating to the past, present, and/or future programming associated with available radio stations, find a local station with particular song/artist, find similar artist/song/genre, contact information to request a particular song from the available radio station. It is noted that such additional features can be provided through radio station locator platform 103.

According to certain embodiments, platform 103 can also supply a "list builder" feature (option (5)), whereby a list of stations can be dynamically generated from all stations within the current proximity of the mobile device 101. Moreover, this option can also build navigable list of stations.

In this example, mobile phone 101 includes one or more transducers (e.g., speakers) 165 to output audible signals to the user. Cursor buttons 167, keypad 169, and microphone 171 enable users to interact with GUI 161 of display 163. As such, mobile device 600 is, in exemplary embodiments, also capable of speech synthesis and voice recognition. Moreover, the display 163 can be a touch-screen, such that controllers and buttons can be readily activated.

Although the above GUI 161 is shown and described with respect to a mobile device, it is contemplated the GUI 161 can be provided by anyone of the user devices 101a-101e of FIG. 1, for example.

Returning to FIG. 1A, in some embodiments, system 100 facilitates remote mobile device tracking by enabling subscribers (or users) to access platform 103 via one or more client devices (e.g., computing device 105, voice station 107, or another mobile device (not shown)) to register to the station locator services of system 100, as well as to create, customize, and manage one or more user profiles stored to, for example, user profiles repository 117 or any other suitable storage location of (or accessible to) the components or facilities of system 100. In this manner, subscribers may submit requests to platform 103 in order to remotely subscribe their mobile devices 101 to the radio locator service. Subsequently, platform 103 may generate one or more one or more messages to provide station location information (e.g., radio station listing 119) to these devices 101 and/or control signals to remotely activate one or more applications (or application programming interfaces (API)) on mobile devices 101 in support of this service. The one or more messages may include one or more lists of available radio stations. The messages and control signals may be transmitted to mobile devices 101 over one or more of networks 109-115, such as transmitted over one or more of networks 109-115 as part of one or more API directed messages (e.g., API short messaging service (SMS) directed messages). It is noted that platform 103 is described in more detail in accordance with FIG. 2.

In certain exemplary embodiments, access to platform 103 may be obtained via any suitable portal interface, such as a voice portal or a web portal. For example, a networked remote application 121 for implementing the portal may be deployed via platform 103; however, it is contemplated that another facility or component of system 100, such as a frontend, middleware, or backend server, may deploy remote application 121 and, consequently, interface with platform 103. As such, it is contemplated that remote application 121 may be implemented on one or more of client devices 101, 105, and/or 107 and, thereby, configured to interface with platform 103. In certain embodiments, one or more remote applications 121 may function in conjunction with one another to achieve the features and functionalities of system 100, such as one or more of the processes described herein for providing station location information to mobile devices 101.

The portal may include or provide users with the ability to access, configure, manage, and store user profile information to user profiles repository 117, as well as the ability to remotely control, configure, tune, and/or track their mobile devices 101. For example, a user may receive station location information, in the form of a list of multiple radio stations, at a mobile device 101 by initiating such services from another user device 105, and/or 107. As such, platform 103 may be configured to receive or retrieve tracking content from mobile devices 101 and, thereby, store this tracking (and/or a history of radio station preferences and consumption) content to, for example, radio station repository 123. It is contemplated that such information may be additionally (or alternatively) stored to any other suitable storage location or memory of (or accessible to) the components or facilities of system 100. Further, tracking content may generally relate to any signals or information retrieved (or received) from mobile devices 101 that have been (or currently are being) remotely controlled, configured, monitored, tracked, etc. In this manner, the portal may provide subscribers with access to radio station repository 123, so that these subscribers can readily determine which stations are available to them at the various geographic locations.

As seen in FIG. 1A, platform 103 includes remote application 121 for generating message that may be received by mobile device 101. The messages may include station location information corresponding to one or more radio stations within the environment of the mobile device 101. In addition, the remote application 121 may provide commands, instructions, parameters, and/or signals (hereinafter collectively referred to as "control signals") that may be executed on (or by) mobile device 101 via API(s). These control signals may be utilized to remotely activate API(s) to track, configure, monitor, or tune mobile device 101 in response to, for instance, a request to track, configure, monitor, or tune mobile device 101 by an authorized subscriber of the station location information services of system 100. In this manner, the control signals may be utilized to generate, store, or otherwise implement configuration information based on received control signal(s). According to one embodiment, control signals may also be utilized to tune a radio tuner of mobile device 101 to tune into one or more broadcast radio stations. The station location information may be presented in various formats including a list of radio stations categorized by generic criteria and/or by predetermined subscriber criteria. Station location information may include station frequency, station call letters, station address, station contact information, station coverage, program content metadata, and advertisement frequency, and any combination thereof, corresponding to one or more radio stations within the environment surrounding the mobile device 101, which may be utilized by a subscriber to satisfy their listening desires.

In other instances, remote application 121 may generate control signals to remotely activating API(s) on mobile device 101 to cause mobile device 101 to return spatial positioning information (e.g., an address, latitude, longitude, elevation, etc.) corresponding to a location of mobile device 101. For example, users of mobile devices 101 may access the remote application via another user device 105, and/or 107 to request receipt of station location information corresponding to stations within the environment surrounding the mobile device 101. Accordingly, mobile device 101 may be configured to determine corresponding spatial positioning information through conventional satellite positioning system (SPS) technology, such as GPS technology; however, any suitable navigational or location determination technology may be utilized, such as advanced forward link trilateration (A-FLT), assisted-GPS (A-GPS), enhanced cellular identification (CELL-ID), wireless area network (WLAN) positioning, etc. As is well known, SPS technology utilizes a constellation 125 of satellites that transmit signals to receivers (not shown) of, for example, one or more mobile devices 101, so that the receivers may determine corresponding spatial positions (or locations), speeds, directions, and/or timing for mobile devices 101. Mobile devices 101 may report this information to platform 103 to facilitate the remote control and/or tracking services of system 100. It is also noted that platform 103 may "poll" or receive such spatial positioning information from mobile devices 101 in real-time, so as to provide presence service features related to mobile devices 101. As such, the location of, for instance, mobile device 101 may be detected without mobile device 101 having to initiate a voice call or other like communication session. Thus, platform 103 may be configured to present received and/or retrieved spatial positioning information to subscribers, in addition to generated station location information, such as via one or more GUI(s). It is also noted that spatial positioning information may be stored to user profiles repository 117 or any other suitable storage location or memory of (or accessible to) system 100.

Accordingly to particular embodiments, spatial positioning information corresponding to a location of mobile device 101 may be overlaid on, for instance, a topological depiction of a geographic area surrounding the location of mobile device 101, which may also be appended with various cartographic features, such as buildings, landmarks, roadways, signs, and the like, or provided with directions to the location of mobile device 101.

Subscribers may also be given access to the platform 103 to remotely activate API(s) on mobile devices 101 to control or configure one or more features of the device. For example, API(s) may be remotely activated to tune a radio tuner (not shown) of mobile device 101, to one or more radio stations, as well as store the station location information of the one or more radio stations to, for instance, a memory of the mobile device 101, or a networked repository, such as radio station repository 123. Subscribers may also be enabled to erase a memory of mobile device 101, such as for the purpose of purging mobile device 101 of histories (e.g., of station location information), or personal or otherwise sensitive information. Still further, API(s) may be remotely activated to configure features of or services available to mobile device 101, such as to monitor or deactivate an ability of mobile device 101 to transmit and receive information. For instance, control signals may be transmitted to mobile device 101 by platform 103 in order to "lock" mobile device 101 until an appropriate "unlock" code (or signal) is input (or transmitted) to device 101, such as parental locks. As another example, subscribers may be enabled to request platform 103 to monitor usage of the services provided to mobile device 101 via the request platform 103 and, thereby, provide a "log" of such use, which may also enable subscribers to determine whether or not their devices have exceeded usage constraints or unauthorized usage.

Accordingly, platform 103 via, for example, remote application 121 may be configured to issue control signals via various bearers to mobile devices 101, such as in the form of one or more call control setup messages, short messaging service (SMS) messages, enhanced messaging service (EMS) messages, multimedia messaging service (MMS) messages, electronic mail, files, or any other suitable bearer, as well as any suitable combination thereof. In particular implementations, these bearer mediums may include control signals in various forms, including attention (AT) commands, menu traversal paths, function codes, voice data, dual-tone multi-frequency (DTMF) signals, scripts, strings, parameters, object variables, and the like. It is noted that these control signals can be used in lieu of "software code," and therefore, may be directly integrated into the control logic of mobile device 101, thereby requiring less processing and hence, less power. It is contemplated, however, that coded instructions may also be utilized. As such, these control signals may be utilized by API(s) to facilitate the remote control and/or tracking services of system 100.

It is noted that messages and/or control signals generated by, for example, remote application 121 of platform 103 may be transmitted to mobile devices 101 via one or more of communication networks 109-115. To prevent unauthorized individuals from accessing the remote control and/or tracking services of platform 103, authentication information may be required. For instance, a username and password procedure may be employed. According to one embodiment, subscribers may be required to enter a code (e.g., personal identification number (PIN), etc.) before accessing the features and functionality of platform 103. Similarly, to prevent the implementation of unauthorized control signals otherwise received at mobile device 101, platform 103 may include an authentication identifier when transmitting control signals to mobile devices 101. For instance, messages and control signals may be encrypted, either symmetrically or asymmetrically, such that a hash value can be utilized to authenticate received control signals, as well as ensure that those control signals have not been impermissibly alerted in transit. As such, control signals may include various identifiers, keys, random numbers, random handshakes, digital signatures, and the like. Further, these authenticating schemas may themselves be encrypted or otherwise secured.

According to exemplary embodiments, mobile devices 101 may include one or more application protocol interfaces (API), such as a set of APIs included within, for example, a binary runtime environment for wireless (BREW) platform, for receiving messages and/or control signals from platform 103 and, thereby, for being remotely activated, configured, tuned, tracked, etc., by platform 103. It is contemplated, however, that one or more other mobile client applications may be utilized, such as one or more applications written in one or more programming languages, such as C, C++, J2ME, Java, etc. As such, API(s) may be configured to, in response to messages being received from, for instance, platform 103, enable tuning of a tuner interface (e.g., a radio tuner) of mobile device 101. These signals may relate to acoustic(s) or image(s) of an environment surrounding mobile device 101. In other instances, API(s) may determine spatial positioning, backup or erase a memory (not shown), configure (or reconfigure) functions, obtain usage logs, terminate services, etc., of or associated with mobile devices 101.

In exemplary embodiments, mobile devices 101 transmit, via one or more of networks 109-115, the spatial positioning information of mobile devices 101 to platform 103. Other information or signals may also be transmitted by mobile devices 101 to platform 103, such as station location information service usage information, device usage information, subscriber preferences, etc. These signals and/or information may be stored to any suitable storage location or memory of (or accessible to) the components and/or facilities of system 100, such as radio station repository 123. In other instances, the signals and/or information may be presented to subscribers, such as via one or more GUI(s). GUIs (not shown) for tracking a mobile device 101 and presenting signals and/or information provided by tracked mobile devices 101 to subscribers may be included in the system 100.

Still further, remote application 121 may enable subscribers to submit a request directly to one or more broadcast stations 127, such as a request for station location information corresponding to the broadcast stations 127. The broadcast stations 127 that are available and in proximity to the mobile device 101 (e.g., within the environment of the mobile devices 101), such that their broadcasts can be tuned into at the location of the mobile device 101, generate station location information corresponding to the broadcast station, and which is to be presented to the broadcast stations 127. Subscribers may generate user profiles including one or more variables, values, parameters, polices, etc., for specifying one or more particular broadcast stations 127 that are to receive spatial positioning information of mobile device 101, such as one or more broadcast stations 127 that provide news radio broadcasts, within a predetermined vicinity of the environment surrounding a tracked mobile device 101. It is noted that generated reports may also include one or more of the captured signals and/or information received from mobile device 101. For instance, a report may include information tracking the spatial positioning of mobile device 101 in real-time, such that the broadcast station 127 (or other authorized individuals or entities) can provide station location information to the mobile device 101.

As seen in FIG. 1A, service provider network 111 enables client devices 101, 105, and 107 to access the features and functionality of platform 103 via one or more of networks 109, 113, and 115. Networks 109-115 may be any suitable wireline and/or wireless network. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 109 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 111 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, or other suitable infrastructure to support control and signaling functions. As such, the conjunction of networks 109-115 may be adapted to facilitate the radio station locator services of system 100.

According to exemplary embodiments, client devices 101, 105, and 107 may include any customer premise equipment (CPE) capable of sending and/or receiving information over one or more of networks 109-115. For instance, voice terminal 107 may be any suitable plain old telephone service (POTS) device, facsimile machine, etc., whereas mobile terminal 101 may be any cellular phone, radiophone, satellite phone, smart phone, wireless phone, or any other suitable mobile device, such as a personal digital assistant (PDA), pocket personal computer, tablet, customized hardware, etc. Further, computing device 105 may be any suitable computing device, such as a VoIP phone, skinny client control protocol (SCCP) phone, session initiation protocol (SIP) phone, IP phone, personal computer, softphone, workstation, terminal, server, etc. Even though only a limited number of user devices 101, 105, and 107 are illustrated, it is contemplated that system 100 can support a plurality of user devices 101, 105, and 107.

As previously mentioned, system 100 may also include user profiles repository 117 for storing subscriber information, such as billing information, contact information, demographic information, location information, mobile station configurations, subscription parameters, and the like. User profiles repository 117 may also be utilized to store data relating to authorized users of the radio station locator services of system 100, as well as associated authorization information corresponding to those users. Namely, a user of mobile device 101 may establish one or more sub-profiles including usernames, passwords, codes, PINS, etc. to further distinguish various override scenarios. While user profiles repository 117 is depicted as an extension of service provider network 111, it is contemplated that user profiles repository 117 can be integrated into, collocated at, or otherwise in communication with any of the components or facilities of system 100.

In this manner, repositories 117 and 123 may be maintained by a service provider of the station location information providing services of system 100 or may be maintained by any suitable third-party. It is contemplated that the physical implementation of repositories 117 and 123 may take on many forms, including, for example, portions of existing repositories of a service provider, new repositories of a service provider, third-party repositories, and/or shared-repositories. As such, repositories 117 and 123 may be configured for communication over system 100 through any suitable messaging protocol, such as lightweight directory access protocol (LDAP), extensible markup language (XML), open database connectivity (ODBC), structured query language (SQL), and the like, as well as combinations thereof. In those instances when repositories 117 and 123 are provided in distributed fashions, information and content available via repositories 117 and 123 may be located utilizing any suitable querying technique, such as electronic number matching, distributed universal number discovery (DUNDi), uniform resource identifiers (URI), etc.

Thus, a subscriber of (or an individual authorized to use) the station location information providing services of system 100 may initialize a communication session at client devices 105 and 107, as well as at another mobile unit (not shown) to interact with remote application 121 so as to remotely track, configure, monitor, tune, etc., mobile device 101. Furthermore, although the radio station locator services are described with respect to a mobile device 101, it is recognized that the radio station locator services may be applied to any device capable of providing voice communications, such as client devices 105 and 107. In other instance, mobile devices 101 may be integrated with other devices, individuals, objects, etc., and thereby enable subscribers to remotely track, configure, monitor, and/or tune these other devices, individuals, objects, etc. While system 100 has been described in accordance with the depicted embodiment of FIG. 1A, it is contemplated that system 100 may embody many forms and include multiple and/or alternative components and facilities.

Figure 2:
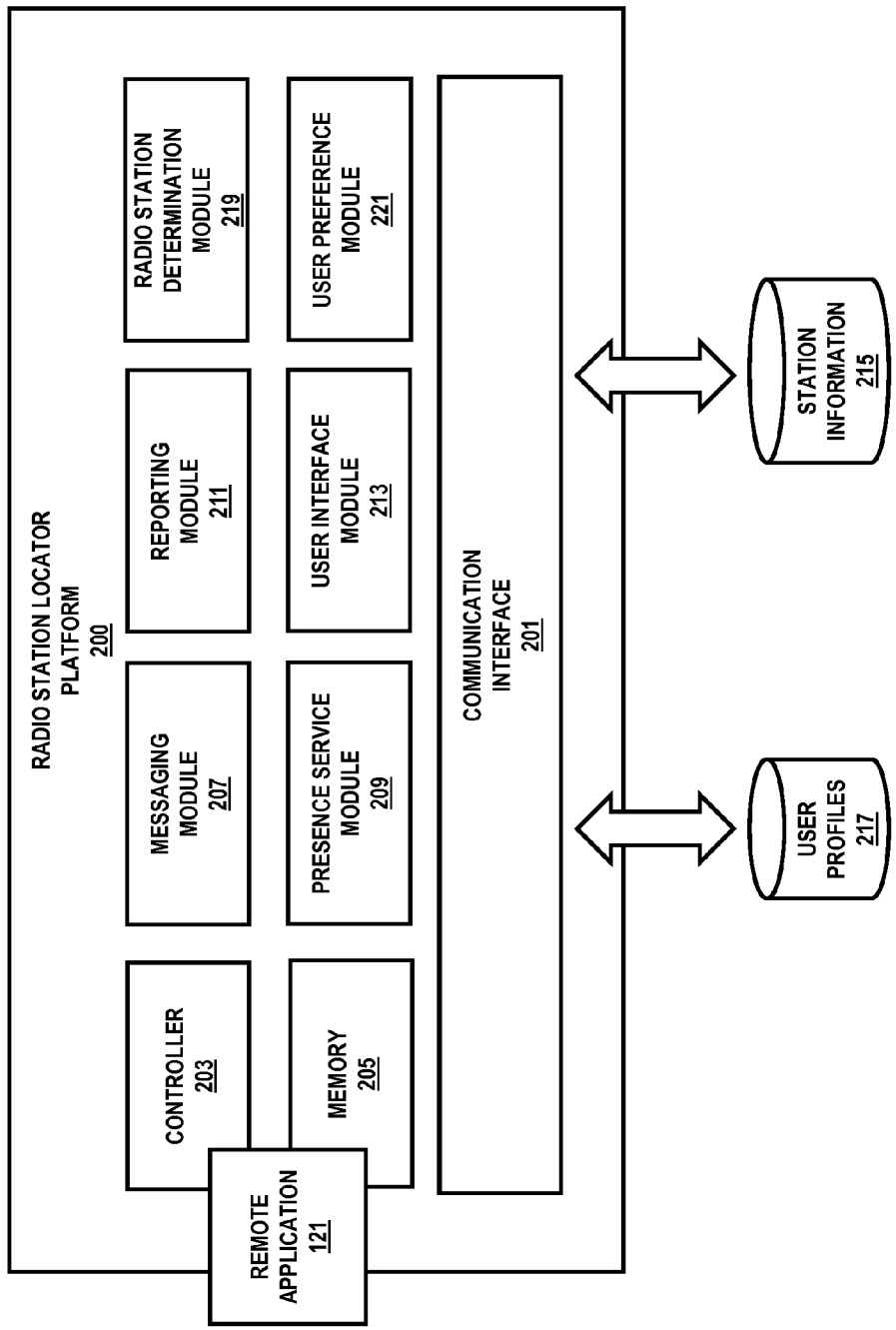
FIG. 2 is a diagram of a radio station locator platform capable of providing station locator services for mobile devices, according to an exemplary embodiment.

FIG. 2 is a diagram of a tracking platform capable of providing radio station locator services, according to an exemplary embodiment. Tracking platform (or platform) 200 may comprise computing hardware (such as described with respect to FIG. 7), as well as include one or more components configured to execute the processes described herein for providing the station location information providing services of system 100. In one implementation, platform 200 includes communication interface 201, controller (or processor) 203, memory 205, messaging module 207, presence service module 209, reporting module 211, and user interface module 213. Platform 200 may also communicate with one or more repositories, such as station information repository 215 and user profiles repository 217. Users may access platform 200 (or the features and functionality provided thereby) via client devices 101, 105, and 107. While specific reference will be made to this particular implementation, it is also contemplated that platform 200 may embody many forms and include multiple and/or alternative components. For example, it is contemplated that the components of platform 200 may be combined, located in separate structures, or separate locations.

According to one embodiment, platform 200 embodies one or more application servers accessible to client devices 101, 103, and 105 over one or more networks 109-115. Users (or subscribers) can access platform 200 to create, customize, and manage one or more user profiles (such as for the purpose of registering mobile devices 101 with the station location information providing services of system 100), as well as for tracking and providing station location information to one or more of these registered mobile devices 101. As such, platform 200 may provide a user interface, e.g., web portal or other networked application, to permit user to access the features and functionality of platform 200 via client devices 101, 105, and 107. According to certain embodiments, user interface module 213 may be configured for exchanging information between client devices 101, 105, and 107 and a web browser or other network-based application or system, such as a voice browser or interactive voice recognition system.

In exemplary embodiments, user interface module 213 may be configured to execute one or more GUIs that are configured to provide users with one or more menus of options for creating, customizing, and managing user profiles, as well as engaging with the other features and functionalities of the tracking station location information services of system 100, such as to enable subscribers to remotely determine and monitor the location and/or surrounding environment of mobile devices 101 when, for instance, the users desires to listen to a radio broadcast. For example, upon the activation of a radio broadcast application operated on the mobile devices 101, spatial positioning information corresponding to the location of the mobile device 101 is transmitted to the platform 200. Additionally (or alternatively), platform 200 may enable users to remotely control mobile devices 101 in order to, for example, backup or erase a memory (not shown), tune a radio tuner, configure (or reconfigure) functions, obtain usage logs, terminate services, etc., of or associated with these devices 101.

In this manner, user interface module 213 (via communication interface 201) may be configured to receive requests for remotely tracking, configuring, monitoring, tuning, etc., mobile devices 101. For example, a subscriber may access platform 200 via a suitable client device (e.g., computing device 105) to obtain station location information of radio stations within the environment of the mobile device 101, or any of the other suitable client devices. The subscriber may submit a corresponding request to track mobile device 101 and, in response thereto, user interface module 213 may port the request to messaging module 207 for generating suitable station location information corresponding to available radio station with the environment of the mobile device. In this manner, user interface module 213 may provide one or more menus, options, tasks, routines, selections, etc., to enable subscribers to submit such requests.

Accordingly, messaging module 207 is configured to generate one or more messages or control signals based on the request that, when received by mobile device 101, are configured to remotely activate one or more applications (e.g., API(s)) on mobile device 101. The control signals may further be configured to tune a radio tuner of mobile device 101, such as to tune to a broadcast station in the environment surrounding mobile device 101. In this manner, messaging module 207 via, for example, communication interface 201, may also be configured to transmit generated station location information messages and/or control signal(s) to mobile device 101, such as over one or more communication networks 109-115 and, in response thereto, configured to receive one or requests for updated station location information from mobile device 101 that are corresponding to user selection (e.g., preferences) and/or related to the environment surrounding mobile device 101, such as spatial positioning information relating to an updated location of mobile device 101, an image of a memory of mobile device 101, a usage log of mobile device 101, etc.

According to exemplary embodiments, messaging module 207 may be configured to generate station location information messages for transmission to mobile device 101 utilizing any suitable bearer, such one or more call control setup messages, short messaging service (SMS) messages, enhanced messaging service (EMS) messages, multimedia messaging service (MMS) messages, electronic mail, files, or any other suitable bearer, as well as any suitable combination thereof. In particular implementations, these bearer mediums may include control signals in various forms, including attention (AT) commands, menu traversal paths, function codes, voice data, dual-tone multi-frequency (DTMF) signals, scripts, strings, parameters, object variables, and the like. It is noted that these control signals can be used in lieu of "software code," and therefore, may be directly integrated into the control logic of mobile device 101, thereby requiring less processing and hence, less power. It is contemplated, however, that coded instructions may also be utilized. It is also contemplated that these control signals and/or bearers may be API directed, such as BREW directed.

As seen in FIG. 2, platform 200 may include presence service module 209 for receiving and, thereby, tracking real-time spatial positioning information from corresponding mobile devices 101. Additionally, presence service module 209 may "poll" mobile devices 101 for spatial positioning information, as well as capture presence information or availability of mobile devices 101. An exemplary model for presence determination is detailed in Internet Engineering Task Force (IETF) Request for Comment (RFC) 2778, which is incorporated herein by reference in its entirety. According to certain exemplary embodiments, the presence or availability of mobile devices 101 may be utilized to determine whether control signals may be transmitted to mobile devices 101, as well provide subscribers with additional information for retrieving their mobile device 101 or ascertaining the identity of a potential perpetrator.

In this manner, captured signals and/or information received from mobile devices 101 may be stored to repository 215 or any other suitable storage location or memory of (or accessible to) platform 200, such as memory 205. This tracking content may also be ported to user interface module 213 for presentation to subscribers via the one or more GUIs. It is noted that this tracking content may relate to signals captured from an audio interface (e.g., a microphone) or an imaging interface (e.g., a camera) of mobile device 101, spatial positioning information relating to a location of mobile device 101, a device usage log corresponding to use of mobile device 101, an image of a memory of mobile device 101, etc., as well as any other suitable content that may facilitate the providing of station location information of radio stations surrounding the environment of mobile devices 101.

According to exemplary embodiments, presenting tracking content to a subscriber may provide enough information to users of mobile devices 101, such that the users may be able to associate the location of the mobile devices 101 with radio stations they have previously been aware of. As such, user interface module 213 may be configured to convey the location (or spatial position) of a mobile device 101 to the subscriber, which may be provided as a short or multimedia message or provided within an automated or personnel-based voice call. In certain embodiments, the spatial position or location of a mobile device 101 may be overlaid on a topical depiction (or map) of a cartographic or geographic area, such that pinpointing the location of mobile device 101 can be quickly ascertained.

Subscribers may also utilize the features and functionalities of platform 200 to submit the spatial position or location of their mobile device 101 to platform 200 and/or one or more broadcast stations to receive station location information corresponding to the one or more broadcast stations. In this manner, user interface module 213 may provide one or more menus, options, tasks, routines, selections, etc., to enable subscribers to submit such requests. A submission of a mobile device status to one or more broadcast stations 127 may be ported to reporting module 211. In exemplary embodiments, reporting module 211 is configured to generate, in response to received requests for station location information, a report including the mobile device status (e.g., location information) for transmission to one or more broadcast stations, such as one or more predefined radio stations 127 stored to a user profile corresponding to the subscriber. For instance, a subscriber may generate a user profile including one or more variables, values, parameters, polices, etc., for specifying one or more particular radio stations 127 that are to receive generated reports. The one or more particular radio stations, such as one or more music radio stations may be within a predetermined vicinity of the environment surrounding mobile device 101. It is noted that generated reports may also include one or more of the captured signals and/or information received from mobile device 101. For instance, a report may include information tracking the spatial positioning of mobile device in real-time, such that the radio station 127 (or other authorized individuals or entities) can determine of the mobile device 101. Such a scenario can be useful when mobile device 101 is traveling with the user. Thus, reporting module 211 via, for instance, communication interface 201, may be configured to transmit generated reports to these radio stations 127 over one or more of networks 109-115.

In order to provide selective access to the features and functionality of platform 200, platform 200 may also include an authentication module (not illustrated) for authenticating (or authorizing) users to platform 200. It is contemplated that the authentication module may operate in concert with communication interface 201 and/or user interface module 213. That is, the authentication module may verify user provided credential information acquired via communication interface 201 and/or user interface module 213 against corresponding credential information stored within a user profile of, for instance, user profiles repository 217. By way of example, the credential information may include "log on" information corresponding to a user name, password, coded key, or other unique identification parameter, such a personal identification number (PIN). In other instances, the credential information may include any one or combination of a birth date, an account number (e.g., bank, credit card, billing code, etc.), a social security number (SSN), an address (e.g., work, home, internet protocol (IP), media access control (MAC), port, etc.), or telephone listing (e.g., work, home, cellular, etc.), as well as any other form of uniquely identifiable datum, e.g., bearer tag identifier, biometric code, voice print, etc. Subscribers may provide this information via client devices 101, 105, and 107, such as by spoken utterances, dual-tone multi-frequency (DTMF) signals, packetized transmission, etc. It is contemplated that unobtrusive security may be provided by positively identifying and screening users based on one or more of the aforementioned credentials which may be seamlessly provided when client devices 101, 105, and 107 communicate with platform 200, such as a unique IP or MAC address. Other unobtrusive measures can be made available via voice prints, etc.

Additionally, platform 200 may include one or more controllers (or processors) 203 for effectuating the aforementioned features and functionality of the tracking and providing of station location information services of system 100, as well as one or more memories 205 for permanent and/or temporary storage of one or more of the aforementioned variables, parameters, information, signals, etc. In this manner, the features and functionalities of remote application 121 may be executed by controller(s) 203 and/or memories 205, such as in conjunction with one or more of the various components of platform 200.

According to certain embodiments, platform 200 may include a radio station determination module 219 to acquire radio station information relating to broadcast station(s) 127. Module 219 can communicate with the systems associated with the broadcast station(s) 127 and/or access other data sources or services. As shown in FIG. 2, platform 200 can include a user preference module 221 that can pull information relating to the musical preference of a subscriber by interfacing with, for example, on-line music stores, on-line music services, or even media player devices (e.g., MP3 players, etc.).

Figure 3:
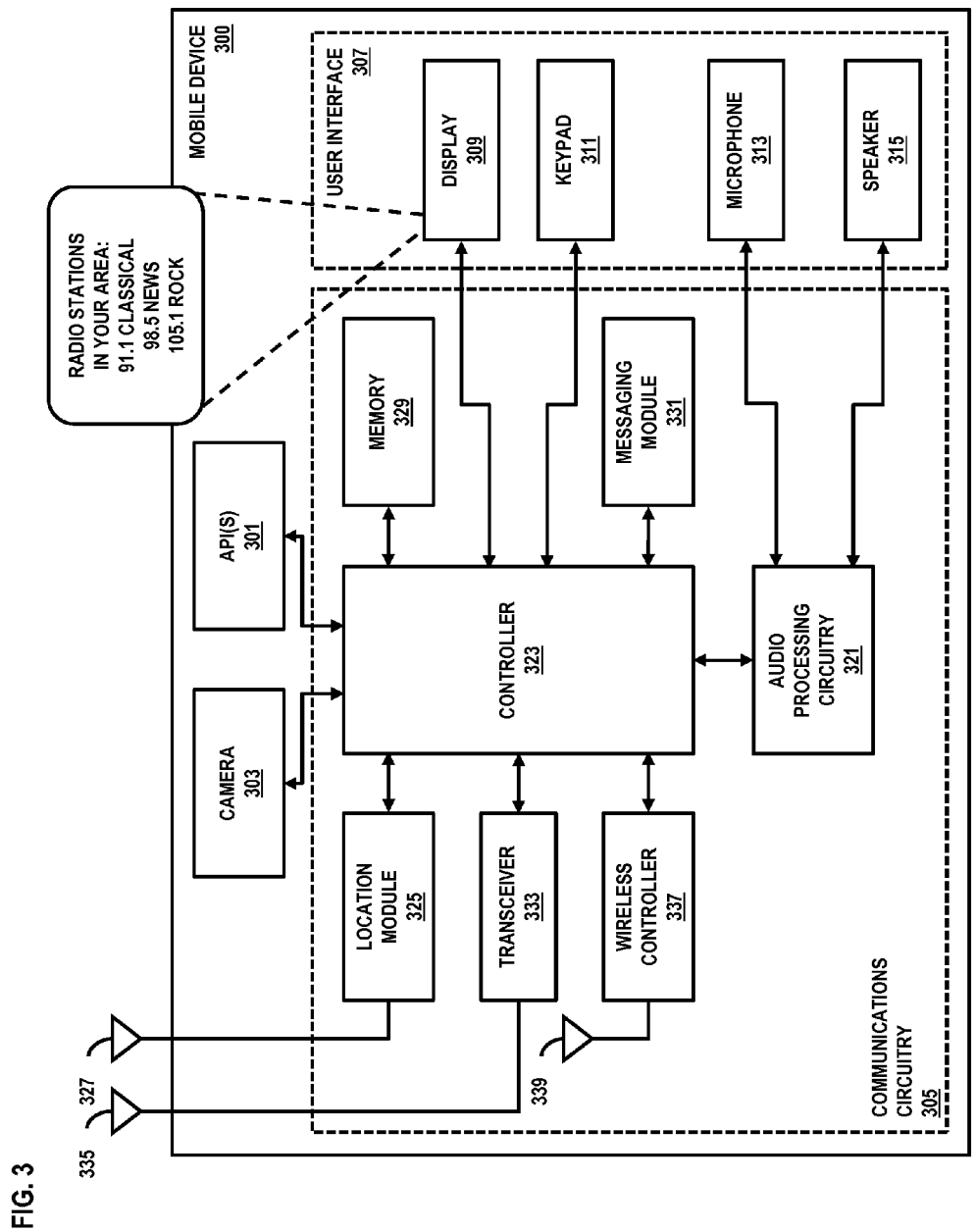
FIG. 3 is a diagram of a mobile device configured to facilitate station locator services, according to an exemplary embodiment.

FIG. 3 is a diagram of a mobile device configured to facilitate tracking and providing of station information services, according to an exemplary embodiment. Mobile device 300 may comprise computing hardware (such as described with respect to FIG. 10), as well as include one or more components configured to execute the processes described herein for facilitating the remote tracking services of system 100. In this example, mobile device 300 includes application programming interface(s) 301, camera 303, communications circuitry 305, and user interface 307. While specific reference will be made hereto, it is contemplated that mobile device 300 may embody many forms and include multiple and/or alternative components.

According to exemplary embodiments, user interface 305 may include one or more displays 309, keypads 311, microphones 313, and/or speakers 315. Display 309 provides a graphical user interface (GUI) that permits a user of mobile device 300 to view dialed digits, call status, menu options, and other radio station information. The GUI may include icons and menus, as well as other text and symbols. Keypad 309 includes an alphanumeric keypad and may represent other input controls, such as one or more button controls, dials, joysticks, touch panels, etc. The user thus can construct user profiles, enter commands, initialize applications, input remote addresses, select options from menu systems, and the like. Microphone 311 coverts spoken utterances of a user (or other auditory sounds, e.g., environmental sounds) into electronic audio signals, whereas speaker 313 converts audio signals into audible sounds.

Communications circuitry 305 may include audio processing circuitry 321, controller 323, location module 325 (such as a GPS receiver) coupled to antenna 327, memory 329, messaging module 331, transceiver 333 coupled to antenna 335, and wireless controller 337 coupled to antenna 339. Memory 329 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 329 may be implemented as one or more discrete devices, stacked devices, or integrated with controller 323. Memory 329 may store information, such as one or more user profiles, one or more user defined policies, one or more contact lists, personal information, sensitive information, work related information, etc.

Additionally, it is contemplated that mobile device 300 may also include one or more applications and, thereby, may store (via memory 329) data associated with these applications for providing users with browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, messages and control signals received by mobile device 300 from, for example, platform 103 may be utilized by API(s) 301 and/or controller 323 to facilitate remotely tracking, tuning, configuring, modifying, and/or utilizing one or more features, options, settings, etc., of these applications. It is also contemplated that these (or other) control signals may be utilized by controller 323 to facilitate remotely backing up and/or erasing data associated with these applications. In other instances, the control signals may cause mobile device 300 to become completely or partially deactivated or otherwise inoperable.

Accordingly, controller 323 controls the operation of mobile station 300, such as in response to commands received from API(s) 301 and/or data stored to memory 329. Control functions may be implemented in a single controller or via multiple controllers. Suitable controllers 323 may include, for example, both general purpose and special purpose controllers and digital signal processors. Controller 323 may interface with audio processing circuitry 321, which provides basic analog output signals to speaker 315 and receives analog audio inputs from microphone 313. In exemplary embodiments, controller 323 may be controlled by API(s) 301 in order to capture signals from camera 303 or microphone 313 in response to control signals received from platform 103. In other instances, controller 323 may be controlled by API(s) 301 to cause location module 325 to determine spatial positioning information corresponding to a location of mobile device 300. Still further, controller 323 may be controlled by API(s) 301 to image (e.g., backup) and/or erase memory 329, to configure (or reconfigure) functions of mobile device 300, to track and generate device usage logs, or to terminate services available to mobile device 300. It is noted that captured signals, device usage logs, memory images, spatial positioning information, and the like, may be transmitted to platform 103 via transceiver 333 and/or wireless controller 337. In this manner, the captured signals and/or other forms of information may be presented to users and stored to one or more networked storage locations, such as user profiles repository 117, radio station repository 123, or any other suitable storage location or memory of (or accessible to) the components and facilities of system 100.

It is noted that real time spatial positioning information may be obtained or determined via location module 325 using, for instance, satellite positioning system technology, such as GPS technology. In this way, location module 325 can behave as (or substantially similar to) a GPS receiver. Thus, mobile device 300 employs location module 325 to communicate with constellation 125 of satellites. These satellites 125 transmit very low power interference and jamming resistant signals received by GPS receivers 325 via, for example, antennas 327. At any point on Earth, GPS receiver 325 can receive signals from multiple satellites, such as six to eleven. Specifically, GPS receiver 325 may determine three-dimensional geolocation (or spatial positioning information) from signals obtained from at least four satellites. Measurements from strategically positioned satellite tracking and monitoring stations are incorporated into orbital models for each satellite to compute precise orbital or clock data. Accordingly, GPS signals may be transmitted over two spread spectrum microwave carrier signals that can be shared by GPS satellites 125. Thus, if mobile device 300 is able to identify signals from at least four satellites 125, receivers 325 may decode the ephemeris and clock data, determine the pseudo range for each satellite 125 and, thereby, compute the spatial positioning of a receiving antenna 327. With GPS technology, mobile device 300 can determine its spatial position with great accuracy and convenience. It is contemplated, however, that location module 325 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time difference (E-OTD), enhanced forward link trilateration (EFLT), network multipath analysis, and the like.

Mobile device 300 also includes messaging module 331 that is configured to receive, transmit, and/or process messages (e.g., EMS messages, SMS messages, MMS messages, IM messages, electronic mail messages, and/or any other suitable message) received from (or transmitted to) platform 103 or any other suitable component or facility of system 100. As previously mentioned, platform 103 may transmit control singles to mobile device 300 in the form of one or more API 301 directed messages, e.g., one or more BREW directed SMS messages. As such, messaging module 331 may be configured to identify such messages, as well as activate API(s) 301, in response thereto. Furthermore, messaging module 331 may be further configured to parse control signals from these messages and, thereby, port parsed control signals to corresponding components of mobile device 300, such as API(s) 301, controller 323, location module 325, memory 329, transceiver 333, wireless controller 337, etc., for implementation.

According to exemplary embodiments, API(s) 301 (once activated) is configured to present station location information included in messages and/or effectuate the implementation of the control signals, received from platform 103, e.g., from remote application 121. It is noted that the control signals are utilized by API(s) 301 to, for instance, remotely tune a radio tuner, control, configure, monitor, track, and/or capture signals from (or related to) camera 303, communications circuitry 305, and/or user interface 307. In this manner, visual and/or acoustic indicia pertaining to an environment surrounding mobile device 300 may captured by API(s) 301 controlling camera 303 and microphone 313. Other control signals to cause mobile device 300 to determine spatial positioning information, to image and/or erase memory 329, to configure (or reconfigure) functions, to track and generate device usage logs, or to terminate services, may also be carried out via API(s) 301. As such, one or more signals captured from camera 303 or microphone 313, or device usage logs, memory images, spatial positioning information, etc., may be transmitted to platform 103 via transceiver 333 and/or wireless controller 337, in response to corresponding control signals provided to transceiver 333 and/or wireless controller 337 by API(s) 301. Thus, captured signals and/or one or more other forms of information provided to platform 103 may be presented to users and/or stored to one or more of user profiles repository 117 and radio station repository 123, or any other suitable storage location or memory of (or accessible to) the components and facilities of system 100.

It is also noted that mobile device 300 can be equipped with wireless controller 337 to communicate with a wireless headset (not shown) or other wireless network. The headset can employ any number of standard radio technologies to communicate with wireless controller 337; for example, the headset can be BLUETOOTH enabled. It is contemplated that other equivalent short range radio technology and protocols can be utilized. While mobile device 300 has been described in accordance with the depicted embodiment of FIG. 3, it is contemplated that mobile device 300 may embody many forms and include multiple and/or alternative components.

Figure 4:
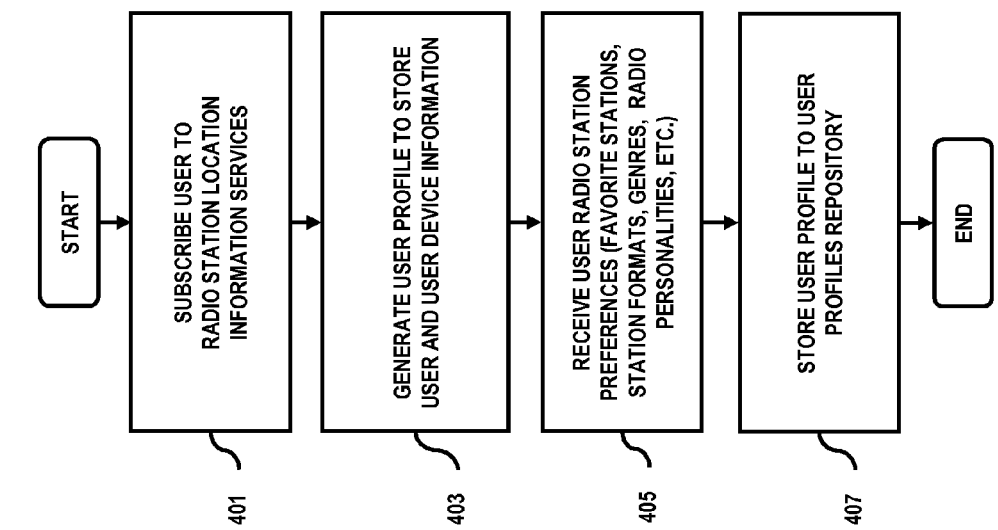
FIG. 4 is a flowchart of a process for subscribing a user to radio station locator services for mobile devices, according to an exemplary embodiment.

FIG. 4 is a flowchart of a process for subscribing a user to station location information services, according to an exemplary embodiment. For illustrative purposes, the process is described with respect to FIGS. 1 and 2. It is noted that the steps of the process may be performed in any suitable order, as well as combined or separated in any suitable manner. In step 401, platform 200 subscribes a user associated with one or more mobile devices (e.g., mobile device 101) to the station location information services. According to one embodiment, the user may subscribe by utilizing any suitable client device capable of processing and transmitting information over one or more of networks 109-115, such as computing device 105. Namely, the user may interact with an input interface (e.g., a keyboard, interactive voice response (IVR) interface, etc.) of, for example, computing device 105 to activate software resident on device 105, such as a GUI or other networked application that interfaces with (or is implemented by) platform 200. Alternatively, the user may interact with a voice portal (not shown) interfacing with (or implemented by) platform 200, wherein speech synthesis and voice recognition techniques are utilized to prompt the user for various information and to reduce spoken utterances of the user and/or other signals (e.g., dual tone multi-frequency signals) associated with the user to one or more corresponding inputs. As such, the user can register as a new subscriber of the radio station locator services and may obtain sufficient authentication information for establishing future sessions with platform 200.

According to certain embodiments, registration procedures may prompt the user to identify mobile devices 101 and/or other client devices, e.g., client devices 105 and 107 that the user may wish to track and receive station location information when, for instance, the user desires to obtain information corresponding to one or more radio stations in an environment associated with the mobile devices 101 and/or other client devices 105 and 107. In this manner, the user may uniquely identify these devices 101, 105, and 107 by entering appropriate device information (or identifiers), such as one or more device types, serial numbers, registration numbers, MAC addresses, directory addresses, communications links, etc., corresponding to devices 101, 105, and 107. In certain exemplary embodiments, platform 200 may obtain corresponding configuration and/or interfacing information relating to these devices from, for example, one or more manufacturers or other third-party suppliers over, for instance, data network 109. It is noted that this configuration and/or interfacing information may be utilized by platform 200 to facilitate the station location information services of system 100. Furthermore, the configuration and/or interfacing information may be stored to any suitable storage location or memory of (or accessible to) system 100, such as user profiles repository 117.

Once registered (or as part of the registration process), platform 200 enables the user, per step 403, to generate and/or edit a user profile. The user profile may include user information, addressing information (e.g., directory number, electronic serial number, international mobile equipment identifier, machine access control address, mobile directory number, mobile equipment identity, mobile identification number, internet protocol address, port address, and/or any other suitable address) corresponding to one or more identified client devices 105 that the user desires to register with the radio station locator services of system 100.

In step 405, platform 200 enables the user to store preferences for customizing the user profile. For example, a user is able enter preferences for favorite radio stations, radio station format (e.g., news, traffic, music, sports), music genre (e.g., classical, rock, hip hop, country), radio personalities (e.g., local radio hosts, nationally syndicated hosts), etc. The preferences stored by the user assists the platform in generating radio station lists by narrowing down the available radio stations presented to the user, to stations that the user is most likely interested in. According to exemplary embodiments, the user preferences may be updated manually by a user, and/or automatically by the platform 200 according to a history of the user's selections.

In step 407, platform 200 stores the user to a list of subscribers to the radio station locator services of system 100, as well as stores the generated user profile, authentication information, device identifies, etc., to, for example, user profiles repository 117. It is noted that platform 200 may additionally (or alternatively) store or synchronize this user profile information to any suitable storage location or memory of (or accessible to) platform 200. Further, it is contemplated that users may directly interact with one or more of these storage facilities or memories, such as user profiles repository 117.

Figure 6:
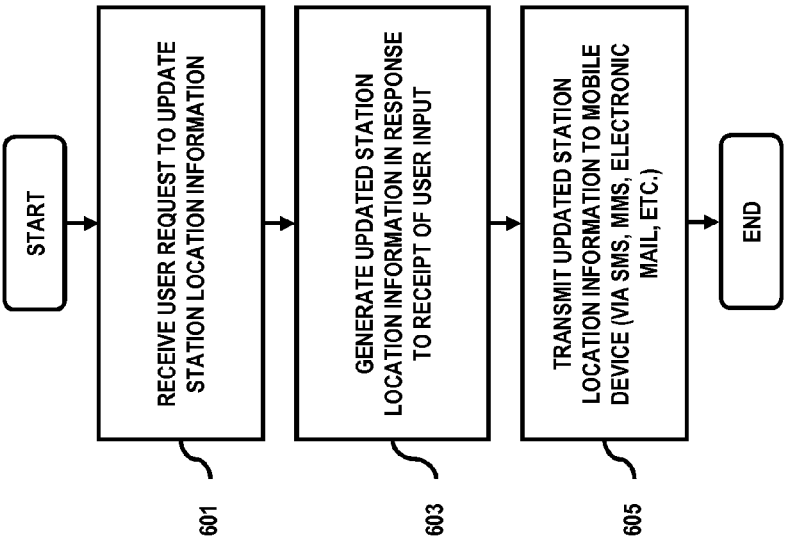
FIGS. 5 and 6 are flowcharts of processes for receiving station location information requests and providing station location information, according to exemplary embodiments.
Figure 5:
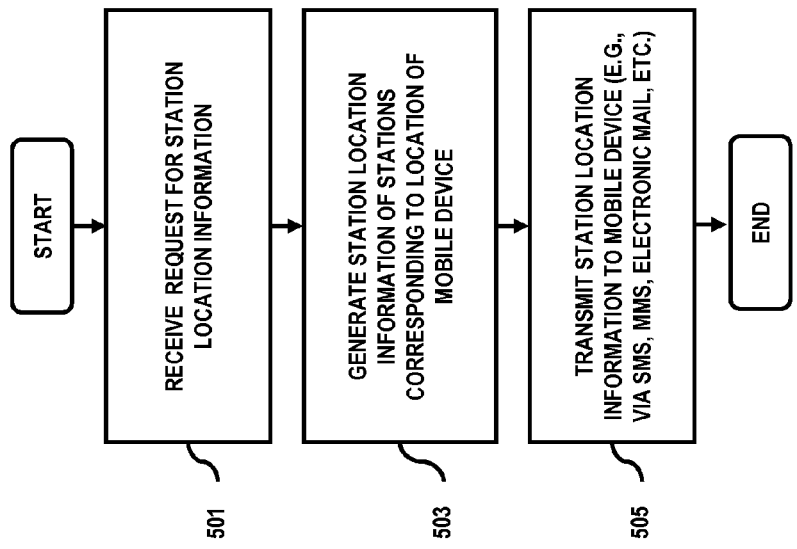

FIGS. 5 and 6 are flowcharts of processes for receiving station location information requests and providing station location information, according to exemplary embodiments. For illustrative purposes, these processes are described with reference to FIGS. 1-3. It is also noted that the process involves, for example, a user desiring to listen to particular radio station. Further, the steps of the processes may be performed in any suitable order, as well as combined or separated in any suitable manner. In particular, FIG. 5A is utilized to describe these processes from the perspective of platform 200. FIG. 5B also is utilized to describe these process from the perspective of platform 200, by depicting an additional process of subscriber feedback (e.g., requests for updated or modified station location information).

In step 501, platform 200 receives a request for station location information. That is, a subscriber via, for example, the mobile device 300, or any other client device 105 or 107, establishes a communication session with platform 200, such as by "logging on" to a networked application (e.g., remote application 121) provided by, for instance, user interface module 213. It is noted that before gaining access, the subscriber may be required to provide credential information, such as a username and password combination. Once "logged on," user interface module 213 may prompt the user with one or more GUIs menus, options, selections, etc., enabling the subscriber to formulate the request, as well as input an address (e.g., telephone number, machine identifier, media access control (MAC) address, internet protocol (IP) address, etc.) of mobile device 300 that the user wants to receive the station location information.

The request for station location information received in step 501, results in communication interface 201 receiving one or more signals captured from the audio interface or the imaging interface of mobile device 300 that, in exemplary embodiments, correspond to acoustic and/or visual indicia of an environment surrounding mobile device 300. Further, per step 501, communication interface 201 may also receive spatial positioning information corresponding to a location of mobile device 300. Using the captured signals and/or the spatial positioning information of mobile device 300, platform 200 determines the location of the mobile device. It is noted that the captured signals and/or spatial positioning information may be stored to radio station repository 123 or any other suitable storage location of (or accessible to) system 100, such as user profiles repository 117.

In step 503, user interface module 213 ports the request to, for instance, messaging module 207 to generate one or more message signals containing station location information corresponding to one or radio stations. The one or more radio stations including the station location information may be determined based on the location of the mobile device 300, proximity to the location of mobile device 300, signal strength, availability, etc. Messaging module 207 may be configured to generate message signals for transmission to mobile device 300 utilizing various bearers, such as in the form of one or more call control setup messages, short messaging service (SMS) messages, enhanced messaging service (EMS) messages, multimedia messaging service (MMS) messages, electronic mail, files, or any other suitable bearer, as well as any suitable combination thereof. These messages may further be directed to API(s) 301, such as one or more BREW directed SMS messages. Thus, In step 505, messaging module 207 via, for example, communication interface 201, transmits the one or more generated message signals (e.g., the one or more BREW directed SMS messages) to mobile device 300 over one or more of networks 109-115 and, in particular, via wireless network 115. As discussed previously, the transmitted messages include station location information corresponding to one or more radio stations that are determined to be within an environment surrounding mobile device 300. This environment surrounding the mobile device may be predetermined to include a particular geographic region and/or other boundaries.

In step 505, generated messages are transmitted to mobile device 300, or other subscriber devices via the network interface, e.g., via one or more GUIs implemented by user interface module 213. In particular, messaging module 207 or reporting module 211 transmits the generated messages accordingly the subscriber preferences and availability determined by presence service module 209.

Referring now to FIG. 6, step 601 is an optional step after step 505, at which platform 200 receives a request to modify and/or update the station location information generated in step 503, based on subscriber feedback to the list of and/or updated mobile device location. For instance, platform 200 receives an update request from subscriber to modify the state location information to include only radio stations that have talk radio formats, and/or to update the location of mobile device 300. The platform 200, in step 603, determines the updated location of the mobile device and generates updated station location information corresponding to radio stations that are within the environment of the mobile device 300 and that match the criteria of the update request. The updated location of mobile device may be included in the user request and/or may be determined by the platform 200. In step 605, platform 200 transmits the updated station information to mobile device 300.

Figure 8:
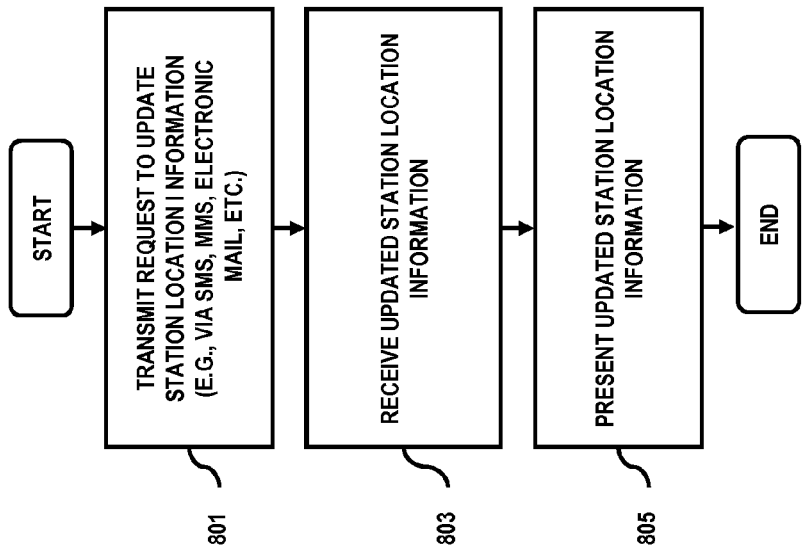
FIGS. 7 and 8 are flowcharts of processes for requesting station location information and receiving station location information, according to an exemplary embodiments.
Figure 7:
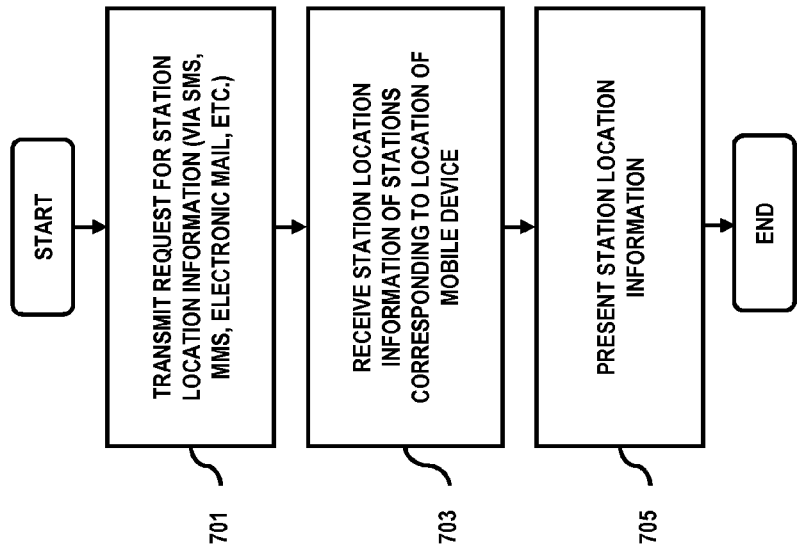

FIGS. 7 and 8 are flowcharts of processes for requesting station location information and receiving station location information, according to exemplary embodiments. For illustrative purposes, these processes are described with reference to FIGS. 1-3. It is also noted that the process involves, for example, a subscriber attempting to locate a radio station in the coverage area of the radio station. Further, the steps of the processes may be performed in any suitable order, as well as combined or separated in any suitable manner.

As seen in FIG. 7, in step 701, a subscriber via, for example, mobile device 300, or any other client device 105, 107, transmits a request for station location information. The request may be transmitted to platform 200, and/or to one or more radio stations. Mobile device 300 may transmit spatial positioning information corresponding to the location of mobile device 300, and/or the platform 200 may obtain spatial positioning information corresponding to a location of mobile device 300 from one or more other sources. The platform 200 determines the location of the mobile device 300 using the captured signals and/or the spatial positioning information of mobile device 300.

In step 703, mobile device 300 receives one or more message signals containing station location information corresponding to one or radio stations from the platform 200. Messaging module 207 of platform 200 may be configured to generate the message signals and transmits the messages utilizing various bearers, such as in the form of one or more call control setup messages, short messaging service (SMS) messages, enhanced messaging service (EMS) messages, multimedia messaging service (MMS) messages, electronic mail, files, or any other suitable bearer, as well as any suitable combination thereof. For instance, API(s) 301 of mobile device 300 may receive one or more BREW directed SMS messages. Mobile device 300 may receive the one or more generated message signals (e.g., the one or more BREW directed SMS messages) over one or more of networks 109-115 and, in particular, via wireless network 115.

In step 705, the station location information may be in the form of a list of one or more radio stations, which is presented to the subscriber via a visual display and/or audio presentation. The station location information may be presented via a GUI, which may include a plurality of "tabs" (or interactive interface elements). The plurality of tabs may provide the subscriber with a plurality of options for navigating the station location information and/or filtering the station location information. For instance, the plurality of tabs may include options for various programming, including but not limited to: traffic, weather, talk radio, music, and comedy. In addition, the plurality of tabs may provide an option to dynamically build a favorites list for a particular location based on subscriber preferences and/or radio station metadata.

Referring to FIG. 8, step 801 is an optional step after step 705, at which a subscriber submits a request to modify and/or update the station location information received. In step 703, based on various criteria and/or updated mobile device location (described with respect to FIG. 1C). The update request may be transmitted to platform 200, and/or to one or more radio stations. For instance, mobile 300 transmits an update request to modify the state location information such that the station location information only includes radio stations that have talk radio formats, and/or to update the location information corresponding to the location of mobile device 300. The radio device 300, in step 803, receives the updated location information transmitted from platform 200, and/or one or more radio stations. The updated station location information is generated by platform 200 and/or one or more radio stations. The updated station location information corresponds to radio stations that are within the environment of the mobile device 300 and that match the criteria of the update request. In step 805, mobile device 300 presents the station location information via a visual display and/or audio presentation. The station location information may be presented via a GUI, which may include a plurality of "tabs" (or interactive interface elements). The plurality of tabs may provide the subscriber with a plurality of options for navigating the station location information and/or filtering the station location information. For instance, the plurality of tabs may include options for various programming, including but not limited to: traffic, weather, talk radio, music, and comedy. In addition, the plurality of tabs may provide an option to dynamically build a favorites list for a particular location based on subscriber preferences and/or radio station metadata.

The described processes, according to certain embodiments, provide a number of advantages. For example, a user can conveniently and effectively determine desired broadcast stations without having to "guess" at the stations that are aligned with the user's tastes. In effect, the radio broadcast medium can be revitalized (i.e., retain or even increase listeners), while enabling a viable service for service providers.

The processes described herein for providing radio station locator service may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
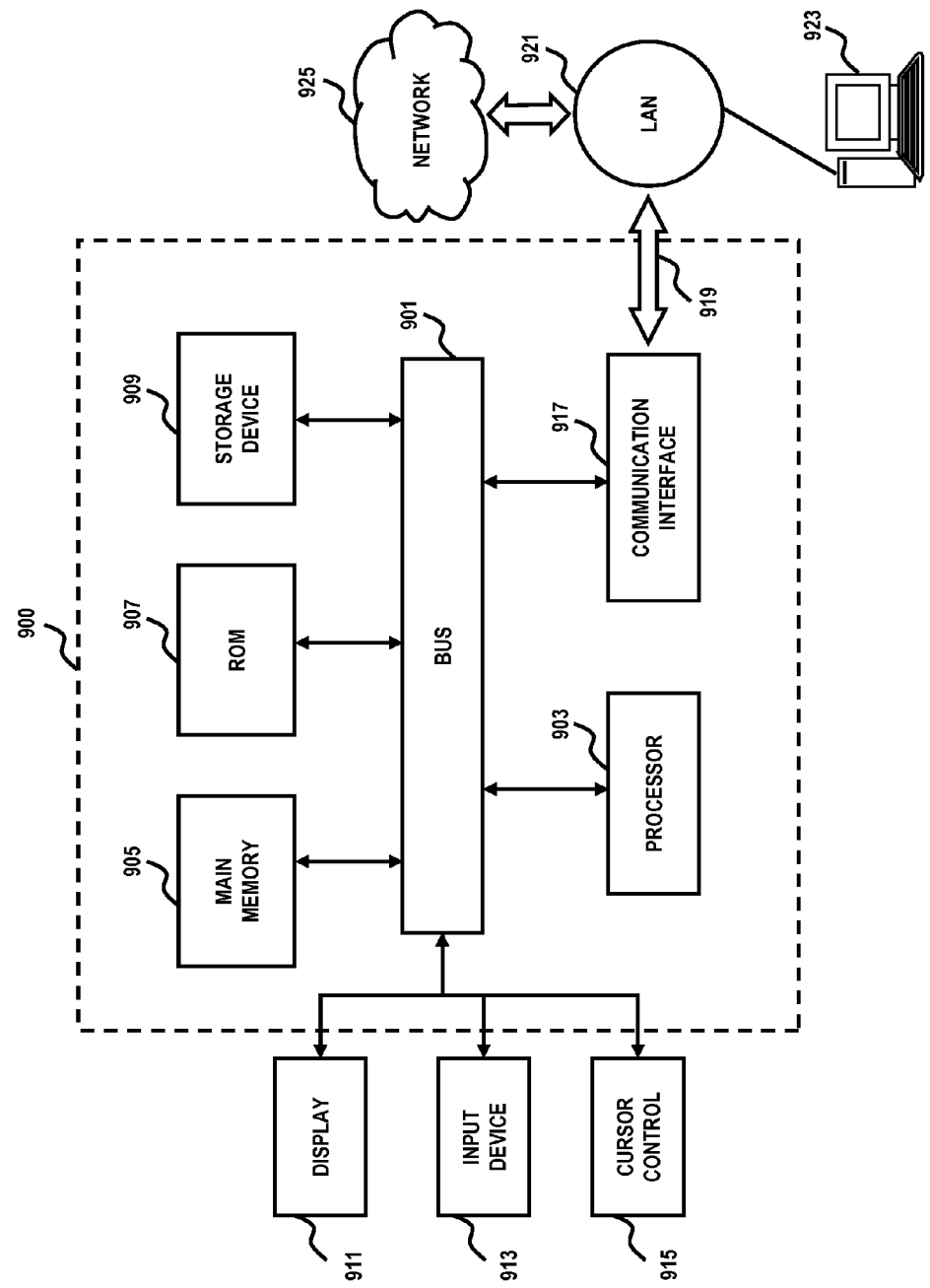
FIG. 9 is a diagram of a computer system that can be used to implement various exemplary embodiments.

FIG. 9 illustrates computing hardware (e.g., computer system) 900 upon which exemplary embodiments can be implemented. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an exemplary embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multiprocessing arrangement may also be employed to execute the instructions contained in main memory 905. In alternative embodiments, hard-wired circuitry may be used in place of or in combination with software instructions to implement exemplary embodiments. Thus, exemplary embodiments are not limited to any specific combination of hardware circuitry and software.

The computer system 900 also includes a communication interface 917 coupled to bus 1001. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
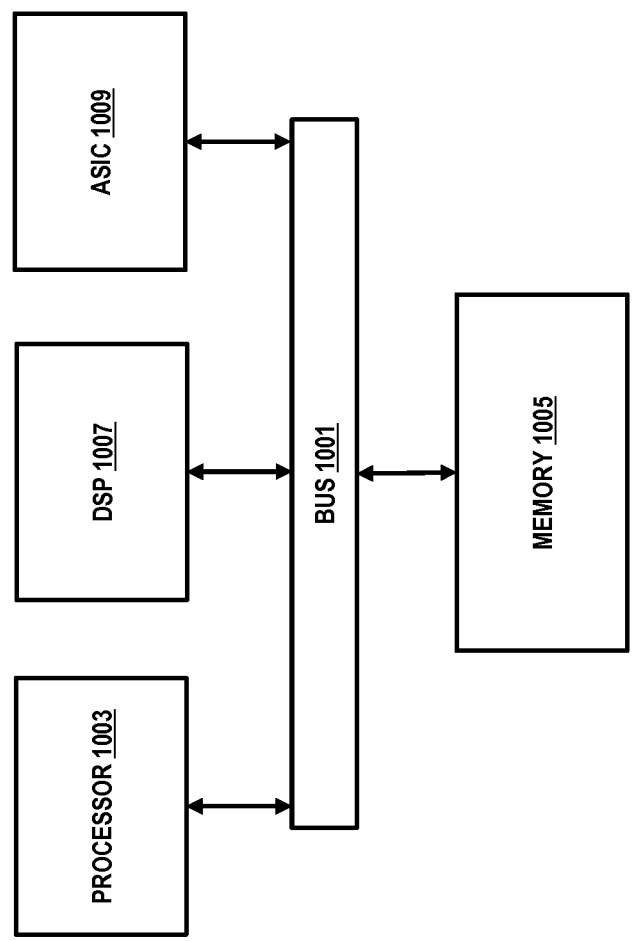
FIG. 10 is a diagram of a chip set that can be used to implement various exemplary embodiments.

FIG. 10 illustrates a chip set 1000 upon which an embodiment of the invention may be implemented. Chip set 1000 is programmed to present a slideshow as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of FIGS. 1B, and 4-8.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving, by an apparatus, spatial positioning information from a first mobile device corresponding to a location of the first mobile device;
generating by the apparatus, in response to the spatial positioning information, one or more message signals including station location information associated with one or more radio stations;
transmitting, in response to a user input at the first mobile device, the one or more generated message signals including the station location information to a second mobile device that is nearby the first mobile device;
causing, at least in part by the apparatus, tuning the second mobile device using the one or more message signals via one or more application programming interfaces (APIs) at the first mobile device;
causing, at least in part, logging usage data of the first mobile device;
determining based on the usage data whether the first mobile device exceeds one or more usage constraints, whether the first mobile device involves unauthorized usage, or a combination thereof; and
causing, at least in part by the apparatus, deactivating the first mobile device from transmitting and receiving information, based, at least in part, on the determination.

2. The method according to claim 1, wherein the station location information comprises at least one of station frequency, station call letters, station location, station contact information, station coverage, program content metadata, advertisement frequency, or a combination thereof, and
the spatial positioning information includes elevation of the first mobile device, and the first mobile device selectively receives radio signals from the one or more radio stations at the elevation.

3. The method according to claim 1, further comprising:
causing, at least in part, presenting the station location information at the second mobile device,
wherein the first mobile device is used by a first user, and the first mobile device is deactivated based further on a request of a second user.

4. The method according to claim 3, wherein the presentation of the station location information includes providing one or more options to refine the station information, and
wherein the first user is a child of the second user.

5. The method according to claim 3, wherein the spatial positioning information is received from the first mobile device in real time and without the first mobile device initiating a communication session, and
  the station location information is determined based on the location of the first mobile device and proximity of the one or more radio stations to the first mobile device.

6. The method according to claim 3, further comprising:
receiving a user request to update the station location information.

7. The method according to claim 6, wherein the user request includes at least one of a user selection, and an update to that spatial positioning information corresponding to the location of the first mobile device.

8. The method according to claim 6, further comprising:
generating, in response to the user request, updated station location information corresponding to the user request; and
presenting the updated station location information at the second mobile device.

9. An apparatus comprising:
a processor; and
at least one memory including computer program instructions,
the at least one memory and the computer program instructions configured to, with the processor, cause the apparatus to perform at least the following:
receive spatial positioning information from a first mobile device corresponding to a location of the first mobile device,
generate, in response to the spatial positioning information, one or more message signals including station location information associated with one or more radio stations;
transmit, in response to a user input at the first mobile device, the one or more generated message signals including the station location information to a second mobile device that is nearby the first mobile device; and
cause, at least in part, tuning the second mobile device using the one or more message signals via one or more application programming interfaces (APIs) at the first mobile device;
cause, at least in part, logging usage data of the first mobile device;
determine based on the usage data whether the first mobile device exceeds one or more usage constraints, whether the first mobile device involves unauthorized usage, or a combination thereof; and
cause, at least in part, deactivating the first mobile device from transmitting and receiving information, based, at least in part, on the determination.

10. The apparatus according to claim 9, wherein the station location information comprises at least one of station frequency, station call letters, station location, station contact information, station coverage, program content metadata, advertisement frequency, or a combination thereof.

11. The apparatus according to claim 9, wherein the apparatus is further caused to:
presenting the station location information at the second mobile device.

12. The apparatus according to claim 11, wherein the presentation of the station location information includes providing one or more options to refine the station information.

13. The apparatus according to claim 11, wherein the station location information is determined based on the location of the first mobile device and proximity of the one or more radio stations to the first mobile device.

14. The apparatus according to claim 11, wherein the apparatus is further caused to:
receive a user request to update the station location information.

15. The apparatus according to claim 14, wherein the user request includes at least one of a user selection, and an update to that spatial positioning information corresponding to the location of the first mobile device.

16. The apparatus according to claim 14, wherein the apparatus is further caused to:
generating, in response to the user request, updated station location information corresponding to the user request; and
presenting the updated station location information.

17. A method comprising:
transmitting, from a first mobile device to a platform, a request for station location information; and
causing, at least in part, a receipt from the platform, at a second mobile device that is nearby the first mobile device, one or more message signals including the station location information, the station location information being associated with one or more radio stations;
causing, at least in part, tuning the second mobile device using the one or more message signals via one or more application programming interfaces (APIs) at the first mobile device;
logging, at the first mobile device, usage data of the first mobile device;
causing, at least in part, a determination based on the usage data whether the first mobile device exceeds one or more usage constraints, whether the first mobile device involves unauthorized usage, or a combination thereof; and
in response to one or more control signals from the platform, deactivating the first mobile device from transmitting and receiving information, based, at least in part, on the determination.

18. The method according to claim 17, wherein the station location information is received at the second mobile device via at least one of short messaging service (SMS) messages, enhanced messaging service (EMS) messages, multimedia messaging service (MMS) messages, electronic mail, a file, or a combination thereof.

19. The method according to claim 17, wherein the request for station location information comprises the spatial positioning information of the first mobile device and the station location information comprises at least one of station frequency, station call letters, station location, station coverage, program content metadata, advertisement frequency, or a combination thereof.

20. The method according to claim 17, further comprising:
causing, at least in part, a presentation at the second mobile device, the station location information,
wherein the presentation of the station location information includes providing one or more options to refine the station information.

21. The method according to claim 17, further comprising:
transmitting, from the first mobile device, a request to update the station location information;
receiving, at the second mobile device, updated station location information, the updated station location information corresponding to the user request; and
presenting, at the second mobile device, the updated station location information.

22. The method of claim 1, wherein the one or more APIs are included in a binary runtime environment for wireless (BREW).

* * * * *